US011418616B1

(12) United States Patent
Kumar

(10) Patent No.: US 11,418,616 B1
(45) Date of Patent: Aug. 16, 2022

(54) INTELLIGENT PROACTIVE TEMPLATE DRIVEN EDGE CACHING METHOD AND APPARATUS

(71) Applicant: VERIZON PATENT AND LICENSING INC., Basking Ridge, NJ (US)

(72) Inventor: Sunil Kumar, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/536,379

(22) Filed: Nov. 29, 2021

(51) Int. Cl.
*H04L 67/5683* (2022.01)
*H04L 67/5682* (2022.01)
*G06F 9/50* (2006.01)
*H04L 67/1097* (2022.01)
*H04L 67/55* (2022.01)
*H04L 67/306* (2022.01)

(52) U.S. Cl.
CPC ........ *H04L 67/2857* (2013.01); *G06F 9/5016* (2013.01); *H04L 67/1097* (2013.01); *H04L 67/26* (2013.01); *H04L 67/2852* (2013.01); *H04L 67/306* (2013.01)

(58) Field of Classification Search
CPC . H04L 67/2857; H04L 67/1097; H04L 67/26; H04L 67/2852; H04L 67/306; G06F 9/5016
See application file for complete search history.

(56) References Cited

U.S. PATENT DOCUMENTS

| 2015/0244775 | A1* | 8/2015 | Vibhor | G06F 11/0772 |
| | | | | 709/203 |
| 2016/0314046 | A1* | 10/2016 | Kumarasamy | G06F 11/1435 |
| 2016/0335009 | A1* | 11/2016 | Vijayan | G06F 11/1469 |
| 2021/0209024 | A1* | 7/2021 | Liang | G06F 12/0868 |

FOREIGN PATENT DOCUMENTS

| CN | 104038518 | A | * | 9/2014 | |
| CN | 113157198 | A | * | 7/2021 | ......... G06F 12/0862 |
| CN | 109033445 | B | * | 8/2021 | |

* cited by examiner

*Primary Examiner* — Shean Tokuta

(57) ABSTRACT

Techniques for intelligent proactive template-driven data caching are disclosed. In one embodiment, a method is disclosed comprising receiving notification of input by the user of a user computing device, identifying a user activity corresponding to the user input, using the identified user activity to obtain a template comprising a number of data retrieval operations for the identified activity and timing information indicating, for each data retrieval operation, a corresponding timing for performing the data retrieval operation, performing a data retrieval operation identified by the template to retrieve data item(s) from data storage remote to the user computing device in accordance with the corresponding timing indicated by the template, causing the retrieved data items to be stored in data storage local to the user computing device.

20 Claims, 7 Drawing Sheets

200

| ID | OP ID | OP NAME | TIMING |
|---|---|---|---|
| 2 | 201 | RUN_LOAD | 0 |
| 2 | 202 | ADD_LOCATION | 15 |
| 2 | 203 | ADD_TN | 40 |
| 2 | 204 | SUBMIT_ORDER | 60 |

INTELLIGENT PROACTIVE TEMPLATE DRIVEN EDGE CACHING METHOD AND APPARATUS

BACKGROUND INFORMATION

The functionality available to a user of a personal computing device (e.g., a smartphone, tablet, laptop, etc.) is limited to the device's finite compute and memory resources. In comparison to a smartphone (or tablet, laptop, etc.), a non-smartphone (also referred to as a basic or dumb phone) is even more limited in compute and memory resources and has even less capabilities as a result. User computing devices such as tablets and laptops typically have more compute and memory resources than a smartphone. Nonetheless, each of these devices has limited compute and memory resources.

A user computing device can make use of external resources. For example, in a cloud computing environment, a user computing device can make use of the resources of a cloud computing device, such as an edge computing device. While a cloud computing device typically has more compute and memory resources than a user computing device, its resources are still limited. In addition, the resources of the cloud computing device must be shared across multiple user computing devices.

BRIEF DESCRIPTION OF THE DRAWINGS

FIG. 2 provides an example of a template corresponding to a new VoIP service request activity in accordance with one or more embodiments of the present disclosure;

DETAILED DESCRIPTION OF EXAMPLE EMBODIMENTS

Techniques for intelligent proactive template-driven data caching are disclosed. Disclosed embodiments can be used to dynamically predict user data requirements and a timing of retrieval of user data needs in accordance with a determined activity of the user. Activity data can be monitored and used to determine the user's activity. The determined user activity can be used to determine a corresponding user activity template, or template. The template can comprise information indicating the data requirements and timing information associated with the determined user activity. The template's data requirements information can comprise information indicating one or more data retrieval operations, each of which can be executed to obtain data for the user in accordance with the determined user activity. Each retrieval operation can have corresponding timing information indicating a timing for retrieving the data. The timing information can reflect a time at which the user is likely to need the data for the determined user activity.

In accordance with one or more embodiments, the timing information can be used to initiate a data retrieval operation to retrieve data from a remote storage location (e.g., a persistent storage location, a cache storage location, etc. remote from a user's computing device) and to transmit the data for storing in a local storage location (e.g., a cache). By way of one non-limiting example, the local storage can be cache provided by an edge server that is in communication with the user's computing device. By way of a further non-limiting example, the edge server can be a part of a cloud computing architecture, and can be located closer to the user's computing device than another server computing device (e.g., another edge server, a core server, etc.) in the cloud computing architecture. By way of a further non-limiting example, the remote data storage location can be another server computing device in the architecture.

Embodiments of the present disclosure can be used in other environments as well. By way of a non-limiting example, embodiments of the present disclosure can be used in a client-server environment, in which the user's computing device can provide temporary data storage for storing the data retrieved from one or more servers.

Figure 1:
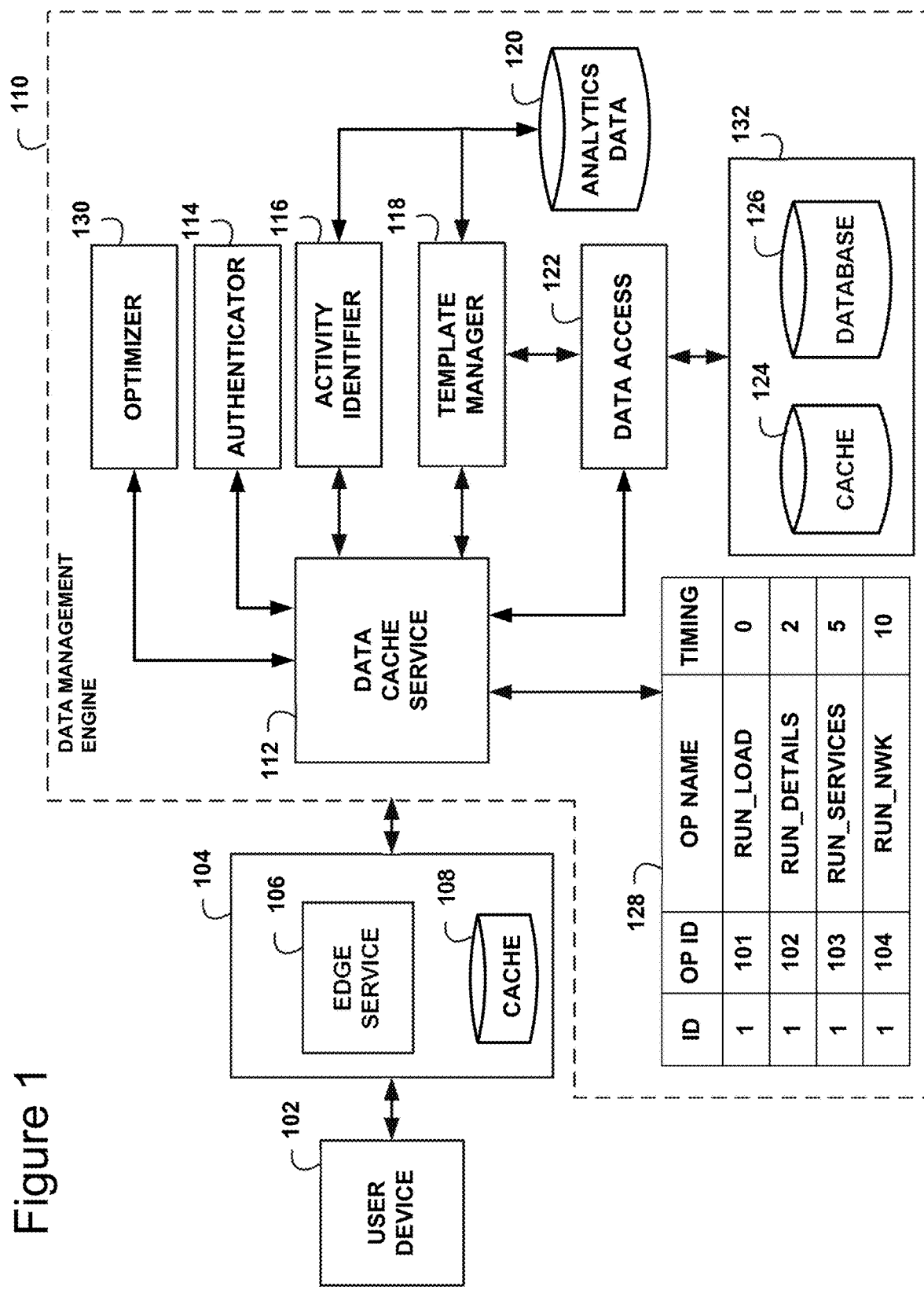
FIG. 1 provides an example illustrating template driven data retrieval and caching in accordance with one or more embodiments of the present disclosure.

FIG. 1 provides an example illustrating template driven data retrieval and caching in accordance with one or more embodiments of the present disclosure. In the example shown in FIG. 1, the local cache is provided by edge computing device 104. Edge computing device 104 is in communication with user device 102 and a data management engine 110. Data management engine can be provided by a computing device other than edge computing device 104 in a cloud computing architecture, such as a core computing device, another edge server, server computing device, or the like.

In accordance with one or more embodiments, edge computing device 104 can comprise edge service 106 and cache 108 for temporarily storing data for user device 102. By way of a non-limiting example, user device 102 can execute an application (e.g., browser application, a service provider's application, etc.) that is in communication (e.g., via a communications network) with edge service 106. By way of a non-limiting example, the user device 102 can communicate with edge service 106 to request data, forward user input, etc.

By way of a non-limiting example, initial user input received by edge service 106 can comprise user login information signaling a new user session. Edge service 106 can be in communication with data cache service 112. By way of a non-limiting example, edge service 106 can use an application programming interface (API) to notify (e.g., via a background asynchronous call to) data cache service 112 of the user activity. The following provides a non-limiting example of such a notification: notifyActivity (userData, activityData). In accordance with one or more embodiments, userData and activityData can be JavaScript® Object Notation (JSON) objects, or other data construct.

In accordance with one or more embodiments, the user-Data construct can comprise user identification information, such as user identification information (e.g., a user identifier (userID), user name, or the like). The user identification information can be used by the data cache service 112 to confirm that the user is a valid, authorized user. A separate login process (e.g., at an enterprise layer) can be used to validate the user's authentication information (e.g., userID and password). The activityData data construct can comprise information identifying a current transaction or activity initiated by user. By way of some non-limiting example, activityData can comprise information identifying an application being used by the user, a menu option selected by the user, a request made by the user, or the like. As discussed in more detail below, the data cache service 112 can use information included in activityData to identify a template, which the data cache service 112 can use to determine the data requirements and timing information for the identified user activity.

In accordance with one or more embodiments, data cache service 112 can request authenticator 114 to authenticate the user (e.g., using the user's authentication information). If the user is successfully authenticated by the authenticator 114, the data cache service 112 can forward some or all of the activity data to activity identifier 116 to identify a current activity corresponding to the activity data.

In accordance with one or more embodiments, activity identifier 116 can use user information (e.g., some or all of the userData received by data cache service 112 from edge service 106) can be used to retrieve historical information corresponding to the user from analytics data 120. The activity identifier 116 can use the retrieved information alone or in combination with current activity data (e.g., the activityData received by data cache service 112) to recognize the user's current activity.

In accordance with one or more embodiments, activity identifier 116 can access analytics data 120 comprising historical information about previous activities engaged in by the user (and/or other users) to recognize the user's current activity. The historical information can include a profile of the user's past and current activities. The user profile can comprise information indicating the user actions when undertaking a given activity. The historical information can include information about an open, or ongoing, activity of the user. The historical information can include a current status (e.g., open, complete, etc.) of each activity of the user. The user is likely to be interested in completing an open activity (e.g., a pending purchase activity, service request, etc.). The historical information can include information about one or more of the user's past sessions, activities, etc. In any case, activity data received by data cache service 112 from edge service 106 can be used together with the historical information from the analytics data 120 to recognize the user's current activity.

In the event that activity identifier 116 identifies an activity of the user using the analytics data 120 and the activityData received from edge service 106, activity identifier 116 can communicate the activity to the data cache service 112.

In accordance with one or more embodiments, activity identifier 116 can include a recommender that can recommend an activity in a case that it cannot identify an activity of the user using the analytics data 120 and the activityData received from edge service 106. In accordance with one or more embodiments, the recommender can be a collaboration-based filter that uses a k-means neighborhood algorithm to identify an activity. By way of a non-limiting example, the identified activity can be an activity of another user with similar characteristics.

The data cache service 112 can use the recognized activity to request a template from template manager 118. In accordance with one or more embodiments, template manager 118 can retrieve the template from storage 132. By way of a non-limiting example, the retrieved template can be retrieved from database 126 and stored in cache 124 for access by data cache service 112.

By way of a non-limiting example, in a case that the activity identifier 116 determines that the activity is a login activity indicating the user's intent to start a new user session, a default template can be used. By way of a further non-limiting example, the current activity can relate to a pending order and a user intent to review, manage, complete, etc. the pending order. As is discussed in more detail below in connection with template 128, the template can be used to retrieve data about the order at various levels of detail.

In accordance with one or more embodiments, each user activity can be mapped to a respective template. A template can comprise information identifying an operation (e.g., a data retrieval operation) typically used in connection with an activity of the user and a timing associated with the operation. Timing information associated with an operation can be used to determine a timing for performing the operation. By way of a non-limiting example, the timing information associated with a data retrieval operation can be used to determine when to perform the data retrieval operation to retrieve data from remote storage so that it is available at a local storage location (e.g., cache 108) in time for the user to use at user device 102. The timing information corresponding to the data retrieval operation can take into account when the data is likely to be accessed by the user in connection with the current activity. In accordance with one or more embodiments, different timing information can be used for different operations and different activities.

Template 128 provides a non-limiting example of a template used by data cache service 112. In accordance with one or more embodiments, template 128 can be pre-configured by template manager 118. Template manager 118 can pre-configure template 128 using historical information to determine, for the corresponding activity, the operations to be performed and the timing to perform each operation. Template 128 can comprise a number of data retrieval operations to be performed to retrieve data for access by the user device 102 in connection with the identified activity. Each template can be associated with a given activity.

In accordance with one or more embodiments, template manager 118 can update a template using feedback obtained in connection with the use of the template. By way of some non-limiting examples, template manager 118 can update the data retrieval operations and/or the timing information associated with a given data retrieval operation. By way of a further non-limiting example, the feedback can indicate that the timing corresponding to an operation is inadequate to meet user needs. The feedback can indicate that users are attempting to access the data before it becomes available. Conversely, the feedback can indicate that the data is made available too early causing the data to be stored in cache 108 for too long a time. In accordance with one or more embodiments, template manager 118 can use deep learning to identify any updates to be made to a template.

In accordance with one or more embodiments, the timing information can indicate a time (e.g., minutes, seconds, milliseconds, etc.) to wait before performing an operation. In connection with the first operation in a template, the wait (or delay) time can be measured relative to a time that the data cache service 112 accesses the template. For subsequent operations identified in the template, the wait (or delay) time can be determined in the same manner. Alternatively, the timing information for subsequent operations can be determined relative to the previous operation. By way of a non-limiting example, the timing information for subsequent operations can be a wait (or delay) time determined from the initiation, completion, etc. of the previous operation.

Template 128 shown in FIG. 1 provides an example of a template corresponding to a pending order of the user. As seen in the example, template 128 includes a template identifier (ID) and a number of data retrieval operations, each one having an identifier (OP ID), name (OP NAME) and timing information (TIMING). The timing information associated with each data retrieval operation indicates a timing for performing the operation. By way of one non-limiting example, the timing information can indicate a wait (or delay) time.

To further illustrate, in a case that the timing information indicates n seconds, it can be used to determine a period of time measured from a certain point (e.g., the initial template access for the initial operation in the template, from the previous data retrieval operation for a subsequent operation, or the like). In the example, the timing information corresponding to the RUN_LOAD operation shows n=0, which indicates that the RUN_LOAD operation is to be performed (or executed) by data cache service 112 without any delay, the next retrieval operation, RUN_DETAILS, is performed next after a 2-second delay, and so on. Each timing example used herein is for the purpose of illustration only, and any timing value and/or units of measurement can be used with embodiments disclosed herein.

In the example shown in FIG. 1, the template 128 can include a number of data retrieval operations to retrieve information about the user's pending order. Template 128 can instruct data cache service 112 to perform the RUN_LOAD data retrieval operation without delay to retrieve general information about the order transaction of the user via data access 122. By way of a non-limiting example, the RUN_LOAD data retrieval operation can retrieve a first level of order information (e.g., order number, order date, name of item ordered, and the like).

According to template 128, data cache service 112 is to wait 2 seconds (e.g., after completing the RUN_LOAD data retrieval operation) before executing the RUN_DETAILS data retrieval operation. By way of a non-limiting example, the RUN_DETAILS data retrieval operation can retrieve more details about the order (e.g., purchase amount including price, taxes, shipping, and the like), which may be needed in response to a user request to view order detail information that is received after the first level of order information is displayed at user device 102.

As can be seen in the example of FIG. 1, the time value of zero associated with the first level of order data instructs the data cache service 112 to retrieve the first level of order information without delay so that it can be presented to the user at user device 102. The 2-second wait time associated with the RUN_DETAILS data retrieval operation can indicate that that data is likely to be requested by the user shortly after viewing the general information about the order. The data cache service 112 can use the timing information corresponding to a data retrieval operation to determine the time to perform the data retrieval operation to retrieve the corresponding data item(s).

The timing information can indicate an optimal time for loading data in cache 108 so that the data is available for access by the user device 102. The optimal time can be such that that the data is loaded in accordance with a timing that the user is likely to access the data. The storage space provided by cache 108 can be intelligently managed using the timing information associated with data. If the data is stored in cache 108 for too long a period before being accessed by the user device 102, the timing information corresponding to the data retrieval operation can be updated to extend the wait time. If the data is stored in cache 108 after the user device 102 accesses cache 108 to retrieve the data, the timing information corresponding to the data retrieval operation can be updated to shorten the wait time.

Embodiments of the present disclosure can use the timing information associated with each data retrieval operation to effectively manage resources. With respect to data storage management, the timing information can be used to anticipate data needs of users being serviced. An intelligent approach can make use of the timing information to allocate temporary storage space (e.g., cache 108, cache 124, etc.) for storing the data that is currently needed (or is likely to be needed by the user within a certain timeframe) and to avoid using storage space for data that is not yet needed (or that is no longer needed). Data items identified by the timing information to be needed by the user can be retrieved and stored in cache, and other data items identified, using the timing information, to not likely be needed (yet) by the user need not occupy storage space.

Cache 108 is typically servicing a number of user devices 102, and space is limited. Advantageously, embodiments of the present disclosure provide a mechanism for identifying an optimal time for storing data in cache 108. In so doing, the number of users that can be serviced by cache 108 can be maximized without requiring the deployment of additional edge computing devices 104.

In addition to optimizing storage space, the timing information can also be used to optimize processing resources. Timing information associated with each operation identified in a template can be used to determine an optimal time to perform the operation. Data cache service 112 (as well as other components of data management engine 110) service a number of user devices 102, and processing resources are limited. Embodiments of the present disclosure provide a mechanism for identifying an optimal time for performing a data retrieval operation. In so doing, the number of users that can be serviced can be maximized.

In addition, since the data needs of a user can be anticipated such that the data is retrieved from a remote permanent storage and cached locally (e.g., at an edge computer's cache, a user computing device, and the like), response time can be minimized (e.g., data service response times can be reduced to within microsecond/millisecond response times), which increases user satisfaction.

Referring again to the template 128 in the example shown in FIG. 1, each data retrieval operation identified in template 128 can comprise one or more database queries (e.g., structured query language, or SQL, query(ies)) used to retrieve one or more data items from storage 132 via data access 122. By way of a non-limiting example, data access 122 can comprise an API which can be used to submit each data retrieval operation to data access 122 to retrieve data from storage 132. By way of a further non-limiting example, data can be retrieved from database 126 and temporarily stored in cache 124. Data access 122 can include a storage manager that can identify whether requested data is to be retrieved from cache 124, from database 126 or some combination thereof.

In accordance with one or more embodiments, each data retrieval operation can result in one or more data items being transmitted by data cache service 112 to edge computing device 104 for storage in cache 108 by edge service 106. In accordance with one or more embodiments, the timing information associated with each data retrieval operation can indicate a timing for performing the associated data retrieval operation so that the associated data is available (e.g., in cache 108) for access by the user's computing device (e.g., user device 102).

In accordance with one or more embodiments, data cache service 112 can receive feedback from edge service 106. By way of a non-limiting example, the feedback can identify when a particular data item was actually accessed by user device 102. The feedback can be used by template manager 118 to update a corresponding template. By way of one non-limiting example, the feedback can indicate that the timing for retrieving the data needs to be updated—e.g., the data is needed earlier, is not needed until a later time, is not needed at all, etc. By way of a non-limiting example, where the feedback indicates that the actual data access time indicates that data retrieval is not timely enough to make the data available when needed at the user's computing device 102, the template can be modified to cause the corresponding data retrieval operation to be initiated sooner (e.g., a few milliseconds earlier) so that data can be retrieved in a timely manner.

In accordance with one or more embodiments, the timing information associated with a template's data retrieval operation(s) can be set (or updated) to accommodate a response Service Level Agreement (SLA). By way of a non-limiting example, if actual load times indicate that a response SLA is not being satisfied, the associated timing information indicated in a template can be calibrated (e.g., reduce the time between retrieval operations) to satisfy the response SLA.

In accordance with one or more embodiments, the data cache service 112 can be in communication with a number of edge computing devices 104. The response received by data cache service 112 via data access 122 can include information identifying a specific edge computing device 104 and a corresponding edge cache 108. The data cache service 112 can use the information to identify the edge computing device 104 to which the data cache service 112 transmits the retrieved data. By way of a non-limiting example, the destination location information indicating the edge computing device 104 and edge cache 108 can be provided to the data cache service 112 as part of API header.

Input received from the user can be used to update data in cache 108. A data update can be transmitted by edge computing device 104 to data cache service 112 so that it can be used to update data in permanent storage (e.g., in database 126). By way of a non-limiting example, edge service 106 can notify data cache service 112 of a data update, and data cache service 112 can use data access 122 to update database 126. Data stored in cache 124 that does not reflect an update made to database 126 can be purged or updated.

In accordance with one or more embodiments, data cache service 112 can use optimizer 130 to manage storage space in cache 108 using a user ranking based on user service subscriptions. By way of a some non-limiting example, user service subscriptions can include premium (e.g., fee-based) and non-premium (free) service subscriptions. Optimizer 130 can rank users in accordance with each user's service subscription type. By way of a non-limiting example, users with a premium service subscription level can be ranked above users with lower-level subscriptions. Data cache service 112 can use the ranking to allocate cache storage space. In accordance with one or more embodiments, storage space in cache 108 can be allocated to users based on the ranking.

In accordance with one or more embodiments, access to cache storage space can be prioritized based on a ranking of users. By way of a non-limiting example, a user with a premium customer service subscription can be given priority access to (or user of) the cache, and other users with non-premium (e.g., free, lower-level, etc. subscriptions) given lower priority access to (or use of) the cache. In a case that cache storage is full or has reached a threshold allocation level, the ranking can be used to determine which users are given access to the cache. By way of a further non-limiting example, where cache storage space is limited, cache storage space can be allocated first to the data needs of higher-ranked users (e.g., premium-subscription users), and any remaining cache storage space can then be allocated to the data needs of lower-ranked users (e.g., users with lower-level subscriptions). In a case that there is no cache storage space remaining, the data for lower-ranked users can be loaded at the user's computing device without using the edge cache 108. That is, rather than storing data in cache 108, the data can be retrieved using data access 122 and transmitted to user device 102 in response to a data request received from user device 102.

In accordance with one or more embodiments, optimizer 130 can monitor and track the data currently stored in cache 108. By way of a non-limiting example, optimizer 130 can track the data that is currently stored in cache 108 using information received from edge service 106. The information received from edge service 106 can include an amount of cache 108 space currently allocated and the data that is stored in cache 108. Before preforming a data retrieval operation indicated by a template, data cache service 112 can check with optimizer 130 to determine whether or not the data that is to be retrieved using the data retrieval operation is already stored in cache 108. If the data identified by the data retrieval operation is already stored in cache 108, optimizer 130 can ensure that the data is not purged from cache 108 and alert data cache service 112 that it is not necessary to retrieve the data from storage 132. Edge service 106 can retrieve the data already stored in cache 108 from cache 108. If the data is not stored in cache 108, the data cache service 112 can perform the data retrieval operation.

In accordance with one or more embodiments, optimizer 130 can monitor the amount of available space in cache. In a case that cache 108 reaches a fullness threshold, optimizer 130 can communicate with edge service 106 to free an amount of space in cache 108. Data that is currently not being used can be purged from the cache 108 initially. By way of a non-limiting example, data associated with a user or activity that is no longer being serviced can be purged from cache 108. If an initial purge of cache 108 does not free enough of the cache 108 space (e.g., the fullness threshold is not satisfied), cached data can be purged using the user ranking determined by optimizer 130. By way of a non-liming example, cached data associated with users having the lowest ranking (e.g., free subscribers) can be purged to free space for use in connection with the higher ranking users (e.g., premium subscribers).

In accordance with one or more embodiments, user activity can be monitored for a change in user activity. Edge service 106 can periodically send user data and activity data (via a notify call or message) to data cache service 112. Data cache service 112 can forward the received information to activity identifier 116 to determine whether or not the user's activity has changed (e.g., the received information indicates that the user has changed activities). If the user's activity data suggests an activity change, activity identifier 116 can notify data cache service 112 of the new user activity. Data cache service 112 can obtain a new template corresponding to the new user activity identified by activity identifier 116 using the received activity data. The new template can be used as a replacement for the template corresponding to the user's prior activity. The new template can be loaded and then used to identify the data requirements associated with the user's detected new activity.

In a case that a cache (e.g., cache 108 and/or cache 124) is storing data no longer needed as a result of a change in activity of a user, optimizer 130 can cause the data to be purged from the cache. If cached data (e.g., a cached template) is being used in connection with another activity or user, there is no need to purge the data from case in response to the activity change. Similarly, if data cached for one user's activity is currently needed (as indicated by the timing information) in connection with another user's activity, there is no need to purge the data.

FIG. 2 provides an example of a template 200 corresponding to a new VoIP service request activity in accordance with one or more embodiments of the present disclosure. In the example, template 200 includes four operations. The first operation involves a data retrieval operation, RUN_LOAD, which retrieves data to present in a customer profile page comprising a listing of the customer's current services and pending orders. The timing information associated with the RUN_LOAD data retrieval operation indicates that operation is to be performed to retrieve the data without delay.

In the example, the customer can select to add a new service from the customer profile page. The next operation, ADD_LOCATION, involves a data retrieval operation that can be used to retrieve default location information for the user from the database 126. The timing information indicates that the ADD_LOCATION data retrieval operation is performed after a 15 second delay.

The next operation, ADD_TN, involves a data retrieval operation that can be used to retrieve available telephone number information to be presented at the user device 102 as a listing of available telephone numbers. The ADD_TN data retrieval operation is performed after a 40 second delay to store the data in cache 108 in anticipation of being needed in response to the user requesting a listing of available telephone numbers. The ADD_LOCATION data retrieval operation can be performed in anticipation of a need by the user using the template. By performing the operation prior to the data being requested by the user, the time for responding to a request for the data can be minimized. This is especially useful in a case that the data retrieval typically takes a substantial amount of time and causes a delay in response time that is noticeable by the user. The template can be used to anticipate the need for the data such that the data can be retrieved (or the retrieval started) before the user actually needs the data, thereby avoiding any delay in response time being noticed by the user.

In accordance with embodiments of the present disclosure, the data can be pre-loaded into cache 108 using the ADD_TN data retrieval operation before the user actually requests the data. By way of a non-limiting example, the data can be loaded into cache 108 while the user is interacting with the user location data entry requirements. Pre-loading the data in cache 108 prior to it being requested by the user can significantly reduce the response time needed to respond to the user's request thereby improving the user's experience.

In the template example shown in FIG. 2, the last operation, SUBMIT ORDER, is to be performed after a 60-second delay and is used to perform one or more operations in connection with the user's order. By way of a non-limiting example, the operation(s) can by operations that can be performed prior to the user submitting the order. By way of a further non-limiting example, the pre-submission operation(s) can involve retrieving any further data via data access 122 needed to process the user's order once the user submits the order. The pre-submission operations can be performed prior to the user actually submitting the order in order to accelerate order processing and provide a quicker response to the user.

In accordance with one or more embodiments, template manager 118 can include a learning engine (e.g., a trained statistical model) that can monitor the notifications (e.g., notifyActivity (userData, activityData) periodically received from edge service 106 for a given user to determine whether or not the user's activity has changed. In a case that template manager 118 determines that the user's activity has changed, template manager 118 can notify data cache service 112 to stop executing the template from the old user activity and to load a new template corresponding to the new activity of the user.

In accordance with one or more embodiments, edge service 106 can provide feedback indicating when cached data was actually accessed by user device 102. The feedback can be used to update the timing information associated with one or more template operations. With reference to FIG. 2, template 200 includes the RUN_LOAD operation which is performed after a 15-second delay. An appropriateness of the timing information associated with the RUN_LOAD operation can be determined using the feedback provided by edge service 106.

Assume for the sake of example that the timing was initially set to be a 20-second delay, and that the feedback from edge service 106 over a period of time (e.g., 1-2 days) and in connection with a number of users indicated that at least 60% of the users that chose to add a service from the customer profile page did so within 15-20 seconds. In the case of these users, the 20-second delay was too much and resulted in the data being cached after it was actually needed. Using the feedback, the template manager 118 can update template 200 to reduce the delay from a 20-second delay to a 15-second delay. The feedback received from edge service 106 after template 200 is updated can be used to evaluate whether the timing change was effective. Assume for the sake of the example, that the feedback received after the timing change indicated that 82% of the users were accommodated by the 15-second delay. If this is considered to be a satisfactory user experience level, no further timing change is needed. Otherwise, the timing information in the template can be updated until a satisfactory user experience level is achieved.

Figure 3:
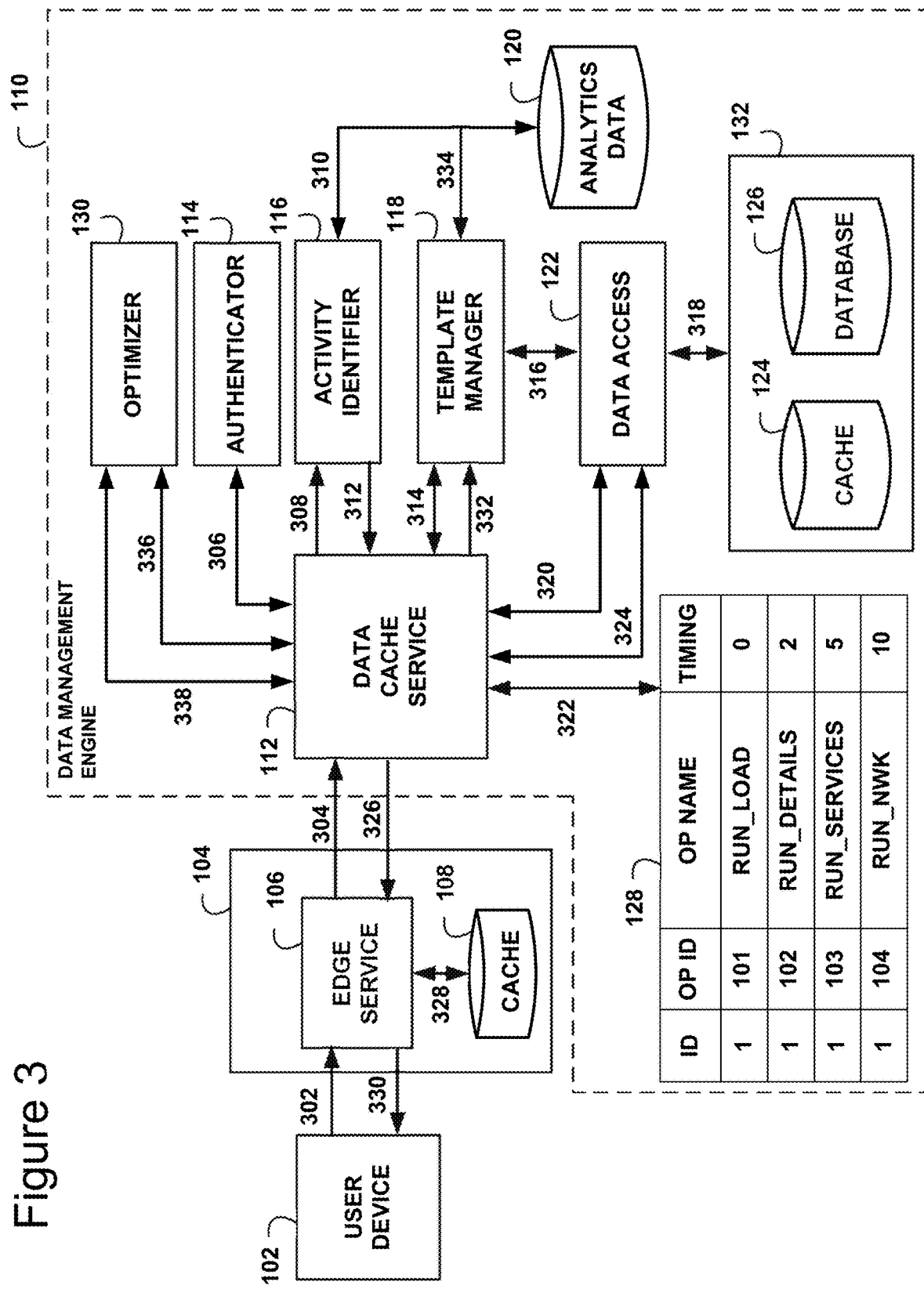
FIG. 3 provides an example diagram illustrating a data processing flow in accordance with one or more embodiments of the present disclosure.

FIG. 3 provides an example diagram illustrating a data processing flow in accordance with one or more embodiments of the present disclosure. For those components shown in both FIGS. 1 and 3, the same reference numerals are used. Edge service 106 receives request 302 from user device 102. By way of a non-limiting example, the request 302 from user device 102 can be responsive to input received from a user at user device 102. By way of a non-limiting example, request 302 can initially be a login request. As discussed in connection with templates 128 and 202, the request can be a request for data to be presented to the user via a user interface at user device 102.

Edge service 106 can receive the request 302 and notify data cache service 112 of the request 302 via notification 304. As discussed herein, notification 304 can include information about the user and an activity of the user, and can have the following form: notifyActivity (userData, activityData). In response to notification 304, data cache service 112 can use authentication operation 306 to confirm with authenticator 114 whether or not the authentication information provided by the user is valid, in a case that request 302 is a login request. In addition and in response to request 304, data cache service 112 can request 308 activity identifier 116 to identify a current activity of the user.

Activity identifier 116 can use the activity data provided in the notification 304 and any historical information retrieved from analytics data 120 via access 310 to identify the current activity of the user. Activity identifier 116 can provide response 312 identifying the current activity if activity identifier 116 is able to make an identification.

Data cache service 112 can obtain 314 the name of a template corresponding to the current activity of the user from template manager 118. By way of a non-limiting example, template manager 118 can access 316 storage 132 via data access 122 to retrieve an identifier of the template identified using a mapping between activity and template. Data access 122 can retrieve 318 the template identifier from storage 132 (e.g., either cache 124 or database 126).

Data cache service 112 can use the template identifier to retrieve 320 the template (e.g., template 128) corresponding to the user's current activity from storage 132 (e.g., cache 124 or database 126) via data access 122. Data cache service 112 can then reference 322 template 128 to identify which operations to perform in connection with the current activity and when to perform each operation. By way of illustration, data cache service 112 can use template 128 to determine to execute the RUN_LOAD operation without delay to retrieve 324 data (e.g., general information about an order transaction of the user) from storage 132 so that the data can be initially presented to the user in connection with the current activity of the user (e.g., order activity). By way of a non-limiting example, the RUN_LOAD operation can be an SQL operation that can be used to retrieve 324 the data from storage 132 via data access 122.

The data retrieved by data cache service 112 from storage 132 using the RUN_LOAD operation can be used in a response 326 sent to edge service 106 in response notification 304. Edge service 106 can access 328 cache 108 to store the retrieved data in cache 108. Edge service 106 can send a response 330 to the request 302 to user device 102 to forward the data from cache 108 to user device 102. An application executing at user device 102 can use the data—e.g., displaying the data in the application's user interface. By way of a non-limiting example, the received data can be presented to the user, manipulated in some manner to generate data presented to the user, etc.

The remaining operations in template 128 correspond with an ongoing user activity. In accordance with one or more embodiments, data needed in connection with the ongoing user activity intended to be available in cache 108 before user device 102 makes a request 302 for the data. Edge service 106 can use notification 304 to provide feedback including information indicating whether or not the data was cached in a timely manner. By way of a non-limiting example, the notification 304 can comprise feedback indicating when a request 302 for the cached data was made to edge service 106 in the ongoing user activity. Data cache service 112 can forward 332 the feedback to template manager 118.

In accordance with one or more embodiments, template manager 118 can access 334 analytics data 120 to store the feedback in connection with the given operation. As discussed herein, template manager 118 can use the feedback received over a period of time in connection with a number of users that engaged in the activity to determine whether or not the given operation is executed in time to have the data available in cache 108 when needed by a user device 102. In the case that the timing information indicates an amount of delay between template operations, template manager 118 may increase or decrease the delay based on the received feedback. Template manager 118 can access 316 storage 132 via data access 122 to make any updates to the template (e.g., template 128).

In accordance with one or more embodiments, optimizer 130 can track the data that is currently stored in cache 108 using information received from edge service 106 (e.g., information received from edge service 106 via notification 304). Prior to performing a data retrieval operation, data cache service 112 can query 336 optimizer 130 to determine whether or not the data that is to be retrieved from storage 132 in connection with a template operation is already stored in cache 108. If the data is already stored in cache 108, data cache service 112 can provide a response 326 to edge service 106 indicating that the data is already stored in cache 108.

In accordance with one or more embodiments, notification 304 received from edge service 106 can indicate an amount of cache 108 space currently allocated. By way of a non-limiting example, data cache service 112 can forward 338 the cache allocation information to optimizer 130. Optimizer 130 can track the data that is stored in cache 108, and can instruct edge service 106 to purge data from cache 108. By way of a non-limiting example, optimizer can forward 338 one or more instructions to data cache service 112, which can then transmit the instruction(s) via response 326 to edge service 106.

Figure 4:
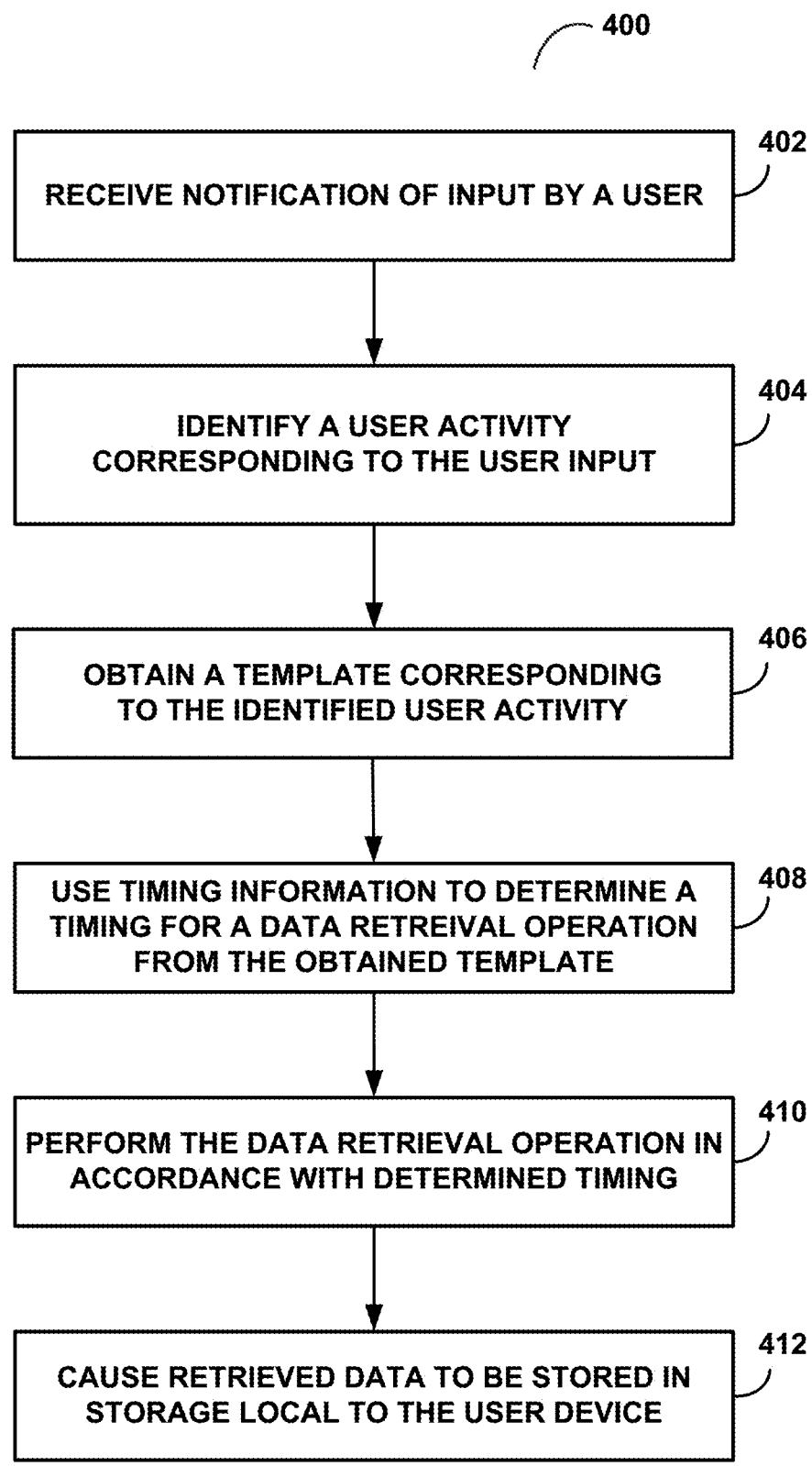
FIG. 4 provides a data cache service process flow in accordance with one or more embodiments of the present disclosure.

FIG. 4 provides a data cache service process flow in accordance with one or more embodiments of the present disclosure. In accordance with one or more embodiments, process 400 can be performed data management engine 110. In accordance with one or more embodiments, data management engine can be a component of a core computing device, a server computing device, a user computing device, etc.

In accordance with one or more embodiments disclosed herein, process 400 can provide a technique for intelligent proactive template driven data caching. Briefly, notification of input by the user of a user computing device (e.g., user device 102) can be received, a user activity corresponding to the user input can be identified, the identified user activity can be used to obtain a template (e.g., template 128) comprising a number of operations (e.g., data retrieval, processing, etc. operations) for the identified activity and timing information indicating, for each operation, a corresponding timing for performing the operation, a data retrieval operation identified by the template can be performed to retrieve data item(s) from data storage (e.g., storage 132) remote to the user computing device in accordance with the corresponding timing indicated by the template, and the retrieved data items can be stored in data storage (e.g., cache 108) local to the user computing device.

Referring to FIG. 4, at step 402 of process 400, notification of input by a user is received. By way of a non-limiting example, the notification can be received by data cache service 112 from edge service 106 in response to input by a user at user device 102. The notification can be notifyActivity (userData, activityData), where userData can comprise user identification information, such as user authentication information (e.g., a user identifier (userID), user name, or the like), and activityData can comprise information identifying a current transaction or activity initiated by user. By way of some non-limiting example, activityData can comprise information identifying an application being used by the user, a menu option selected by the user, a request made by the user, or the like.

At step 404, a user activity corresponding to the identified user activity can be identified. In accordance with one or more embodiments, user information (e.g., some or all of the userData received at step 402) can be used by activity identifier 116 to retrieve historical information corresponding to the user from analytics data 120. The activity identifier 116 can then use the retrieved information alone or in combination with current activity data (e.g., the activityData received at step 402) to identify the user's current activity.

In accordance with one or more embodiments, historical information about previous activities engaged in by the user (and/or other users) can be used to recognize the user's current activity. The historical information can include a profile of the user's past and current activities. The user profile can comprise information indicating the user actions when undertaking a given activity. The historical information can include information about an open, or ongoing, activity of the user. The historical information can include a current status (e.g., open, complete, etc.) of each activity of the user. The user is likely to be interested in completing an open activity (e.g., a pending purchase activity, service request, etc.). The historical information can include information about one or more of the user's past sessions, activities, etc. Thus and by way of a non-limiting example, activity data received at step 402 can be used together with the historical information from the analytics data 120 to identify (e.g., by activity identifier 116) the user's current activity.

At step 406, a template corresponding to the identified user activity can be obtained. By way of a non-limiting example, data cache service 112 can obtain the template (e.g., template 128) from storage 132. In accordance with one or more embodiments, each user activity can be mapped to a respective template. A template can comprise information identifying an operation (e.g., a data retrieval operation) typically used in connection with an activity of the user and a timing associated with the operation. Timing information associated with an operation can be used (e.g., by data cache service 112) to determine a timing for performing the operation.

At step 408, the timing information can be used to determine a timing for performing an operation from the obtained template. By way of a non-limiting example, data cache service 112 can use the timing information corresponding to an operation to determine when to perform the operation. By way of a further non-limiting example, timing information associated with a data retrieval operation can be used to determine when to perform the data retrieval operation to retrieve data from permanent, remote storage (e.g., storage 132) so that it is available at a local storage location (e.g., cache 108) in time for the user to use at user device 102. The timing information corresponding to the data retrieval operation can take into account when the data is likely to be accessed by the user in connection with the current activity. In accordance with one or more embodiments, different timing information can be used for different operations and different activities.

At step 410, the data retrieval operation can be performed in accordance with the determined time. By way of a non-limiting example, data cache service 112 can initiate performance of the data retrieval operation in accordance with the determined time.

At step 412, the retrieved data is caused to be stored in storage local to the user device. By way of a non-limiting example, the data cache service 112 can transmit the retrieved data to edge service 106 with an instruction to store the retrieved data in cache 108. The data stored in cache 108 can then be made available to the user at user device 102.

Figure 5:
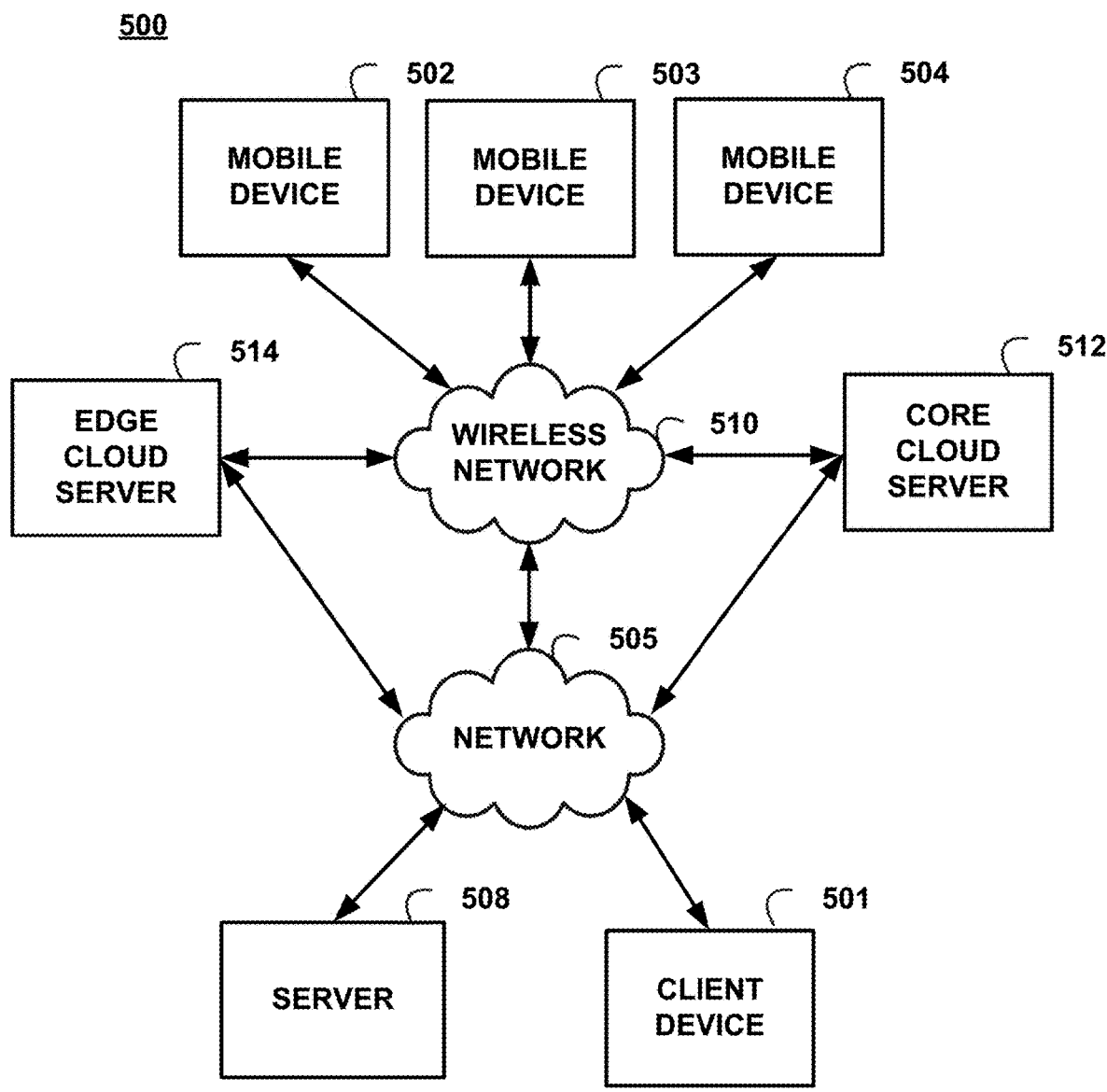
FIG. 5 is a schematic diagram illustrating an example of a network within which the systems and methods disclosed herein could be implemented according to some embodiments of the present disclosure.

FIG. 5 provides an example of components of a general environment in accordance with one or more embodiments. FIG. 5 shows components of a general environment in which the systems and methods discussed herein may be practiced. Not all the components may be required to practice the disclosure, and variations in the arrangement and type of the components may be made without departing from the spirit or scope of the disclosure. As shown, system 500 of FIG. 5 includes local area networks ("LANs")/wide area networks ("WANs")—network 505, wireless network 510, mobile devices (client devices) 502-504 and client device 501. FIG. 5 additionally includes a server 508. Examples of web servers include without limitation, application servers, content servers, search servers, advertising servers, etc.

In accordance with one or more embodiments, one or more of server 508, edge server 514 and core server 512 can include functionality disclosed herein in connection with one or more embodiments. One or more of the servers can host one or more web applications.

In accordance with at least one embodiment, core server 512 and edge server 514 can be configured to provide a cloud computing service for user devices (e.g., mobile devices 502-504, client device 501, etc.) of registered users. Generally, core server 512 can manage user device data and persistent core device instances for registered user devices, perform tasks, facilitate handoffs between edge servers 514, etc. In accordance with at least one embodiment, the edge server 514 is a component of (and be located at) a cellular base station (or cell site) of a mobile (e.g., cellular) network with which a registered user device is communicating.

One embodiment of mobile devices 502-504 is described in more detail below. Generally, however, mobile devices 502-504 may include virtually any portable computing device capable of receiving and sending a message over a network, such as network 505, wireless network 510, or the like. Mobile devices 502-504 may also be described generally as client devices that are configured to be portable. Thus, mobile devices 502-504 may include virtually any portable computing device capable of connecting to another computing device and receiving information. Such devices include multi-touch and portable devices such as, cellular telephones, smart phones, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 502-504 also may include at least one client application that is configured to receive content from another computing device. The client application may include a capability to provide and receive textual content, graphical content, audio content, and the like. In one embodiment, mobile devices 502-504 may uniquely identify themselves through any of a variety of mechanisms, including a phone number, Mobile Identification Number (MIN), an electronic serial number (ESN), or other mobile device identifier.

In some embodiments, mobile devices 502-504 may also communicate with non-mobile client devices, such as client device 501, or the like. Client device 501 may include virtually any computing device capable of communicating over a network to send and receive information. Thus, client device 501 may also have differing capabilities for displaying navigable views of information.

Client device 501 and mobile devices 501-504 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 510 is configured to couple mobile devices 502-504 and its components with network 505. Wireless network 510 may include any of a variety of wireless sub-networks that may further overlay stand-alone ad-hoc networks, and the like, to provide an infrastructure-oriented connection for mobile devices 502-504. Such sub-networks may include mesh networks, Wireless LAN (WLAN) networks, cellular networks, and the like.

Network 505 is configured to communicatively couple web server 508 with other computing devices, including, client device 501, and through wireless network 510 to mobile devices 502-504. Network 505 is enabled to employ any form of computer readable media for communicating information from one electronic device to another. Also, network 505 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs.

A server, such as server 508, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers, such as web server 508 as well as other servers, such as and without limitation authentication servers, search servers, email servers, social networking services servers, SMS servers, IM servers, MMS servers, exchange servers, photo-sharing services servers, and travel services servers, via the network 505 using their various devices 501-504. In some embodiments, application server can host applications, such as an e-commerce application, a search engine, a content recommendation and/or distribution application, etc.

In some embodiments, web server 508 can store various types of applications and application related information including application data. As is discussed in more detail below, examples of application data include user behavior, application behavior, page visitation sequences, and visit intent and action data. In accordance with some embodiments, web server 508 can host an application, or applications, embodying functionality described herein.

Moreover, although FIG. 5 illustrates web server 508 as single computing devices, respectively, the disclosure is not so limited. For example, one or more functions of web server 508 may be distributed across one or more distinct computing devices. Moreover, in one embodiment, web server 508 may be integrated into a single computing device, without departing from the scope of the present disclosure.

Figure 6:
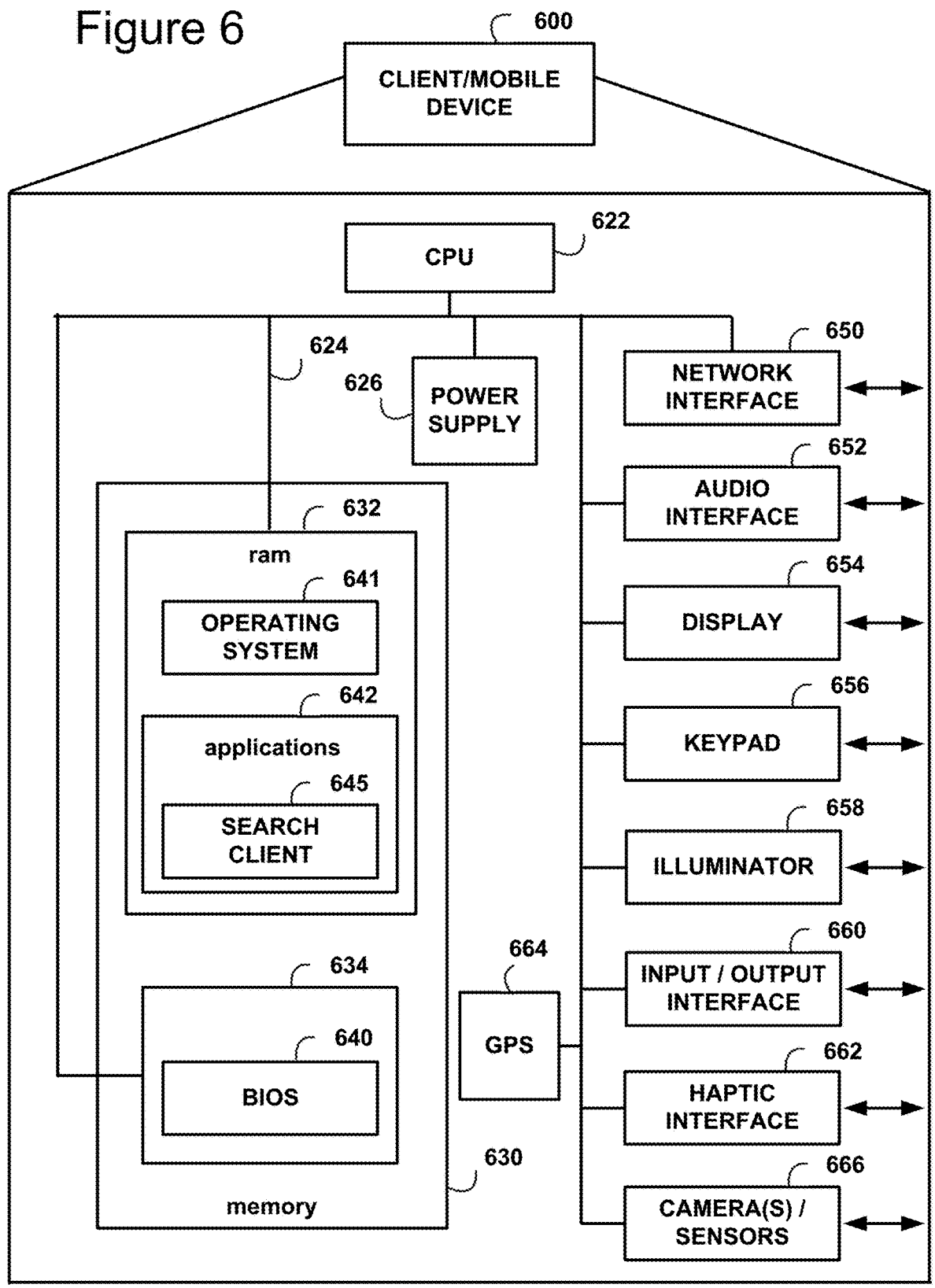
FIG. 6 depicts is a schematic diagram illustrating an example of client device in accordance with some embodiments of the present disclosure.

FIG. 6 is a schematic diagram illustrating an example embodiment of a computing device that may be used within the present disclosure. Device 600 may include many more or less components than those shown in FIG. 6. However, the components shown are sufficient to disclose an illustrative embodiment for implementing the present disclosure. Device 600 may represent, for example, client device 501 and mobile devices 501-504 discussed above in relation to FIG. 5.

As shown in the figure, device 600 includes a processing unit (CPU) 622 in communication with a mass memory 630 via a bus 624. Device 600 also includes a power supply 626, one or more network interfaces 650, an audio interface 652, a display 654, a keypad 656, an illuminator 658, an input/output interface 660, a haptic interface 662, an optional global positioning systems (GPS) transceiver 664 and a camera(s) or other optical, thermal or electromagnetic sensors 666. Device 600 can include one camera/sensor 666, or a plurality of cameras/sensors 666, as understood by those of skill in the art. The positioning of the camera(s)/sensor(s) 666 on device 600 can change per device 600 model, per device 600 capabilities, and the like, or some combination thereof.

Optional GPS transceiver 664 can determine the physical coordinates of device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS or the like, or may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of device 600. The mass memory also stores an operating system 641 for controlling the operation of device 600.

Memory 630 further includes one or more data stores, which can be utilized by device 600 to store, among other things, applications 642 and/or other data. For example, data stores may be employed to store information that describes various capabilities of device 600. The information may then be provided to another device based on any of a variety of events, including being sent as part of a header during a communication, sent upon request, or the like.

Applications 642 may include computer executable instructions which, when executed by device 600, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 642 may further include search client 645 that is configured to send, to receive, and/or to otherwise process a search query and/or search result using any known or to be known communication protocols. Although a single search client 645 is illustrated it should be clear that multiple search clients may be employed.

Figure 7:
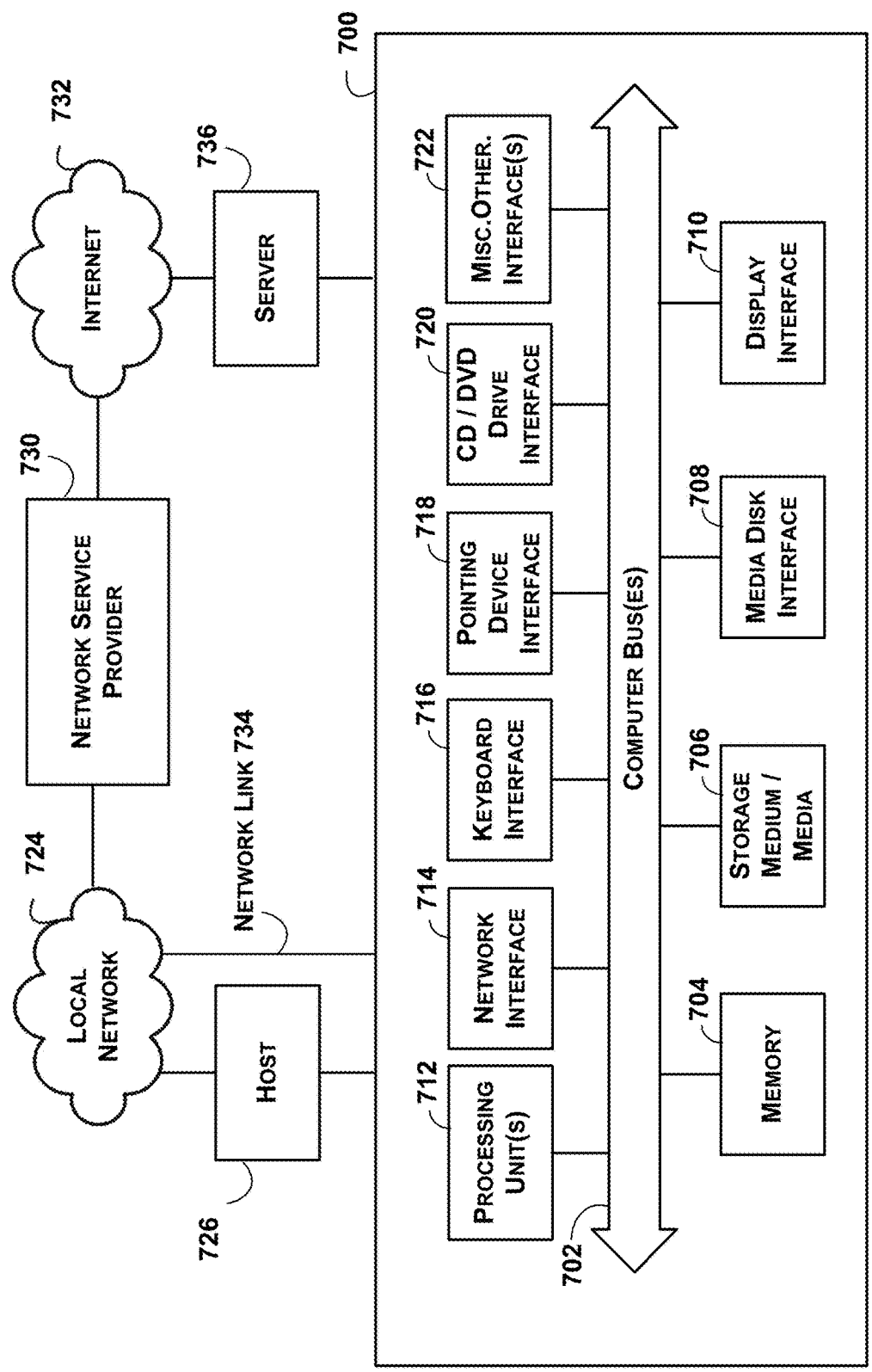
FIG. 7 is a block diagram illustrating the architecture of an exemplary hardware device in accordance with one or more embodiments of the present disclosure.

As shown in FIG. 7, internal system 700 architecture of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, media disk interface 708, network interface 714, memory 704, e.g., random access memory (RAM), run-time transient memory, read only memory (ROM), media disk drive interface 720 as an interface for a drive that can read and/or write to media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 734 typically provides information communication using transmission media through one or more networks to other devices that use or process the information. For example, network link 734 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server 736 connected to the Internet 732 hosts a process that provides a service in response to information received over the Internet 732. For example, server 736 can host a process that provides information representing video data for presentation at a display via display interface 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as a storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 712 as it is received, or may be stored in memory 704 or in a storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.
red in data storage local to the user computing device.

The invention claimed is:

1. A method comprising:
receiving, by a computing device, notification of input by a user of a user computing device;
identifying, by the computing device, a user activity corresponding to the user input;
using, by the computing device, the identified user activity to obtain a template comprising a number of data retrieval operations for the identified activity and timing information corresponding to each data retrieval operation;
using, by the computing device, the timing information corresponding to a data retrieval operation of the number of data retrieval operations to determine a time to perform the data retrieval operation to retrieve corresponding data items from data storage remote to the user computing device;
performing, by the computing device and in accordance with the determined time, the data retrieval operation to retrieve the corresponding data items from data storage remote to the user computing device; and
causing, by the computing device, the corresponding data items to be stored in data storage local to the user computing device.

2. The method of claim 1, further comprising performing the receiving, identifying, using, using, performing and causing steps on a server computing device or a user computing device comprising the computing device.

3. The method of claim 1, identifying the user activity further comprising:
using, by the computing device, user identification information received with the notification to access historical information about prior activities of the user; and
using, by the computing device, the historical information about prior activities of the user and current activity data received with the notification to identify the user activity.

4. The method of claim 3, further comprising using historical information about prior activities of other users to identify the user activity.

5. The method of claim 3, further comprising using collaborative filtering to identify the user activity based on a user activity identified for at least one other user with similar characteristics.

6. The method of claim 1, the timing information for the data retrieval operation indicating an amount of time to wait before performing the data retrieval operation.

7. The method of claim 1, further comprising:
using, by the computing device, historical data access timing information to determine an anticipated access time for the corresponding data items;
receiving, by the computing device, feedback indicating an actual time that the corresponding data items was accessed by a number of user computing devices; and
using, by the computing device, the feedback to determine whether to update the timing information corresponding to the data retrieval operation, the update causing the data retrieval operation to be performed either sooner or later in accordance with the received feedback.

8. The method of claim 1, further comprising:
ranking, by the computing device, a set of users having access to the local data storage; and
allocating, by the computing device, space in the local data storage in accordance with the ranking.

9. The method of claim 8, allocating space in the local data storage in accordance with the ranking is performed in response to a determination that an amount of space allocated in the local data storage satisfies a threshold amount.

10. The method of claim 1, further comprising making a determination that the data items are absent from the data storage local to the user computing device before performing the data retrieval operation and the causing step.

11. A non-transitory computer-readable storage medium tangibly encoded with computer-executable instructions that when executed by a processor associated with a computing device perform a method comprising:
receiving notification of input by a user of a user computing device;
identifying a user activity corresponding to the user input;
using the identified user activity to obtain a template comprising a number of data retrieval operations for the identified activity and timing information corresponding to each data retrieval operation;
using the timing information corresponding to a data retrieval operation of the number of data retrieval operations to determine a time to perform the data retrieval operation to retrieve corresponding data items from data storage remote to the user computing device;
performing, in accordance with the determined time, the data retrieval operation to retrieve the corresponding data items from data storage remote to the user computing device; and
causing the corresponding data items to be stored in data storage local to the user computing device.

12. The non-transitory computer-readable storage medium of claim 11, identifying the user activity further comprising:
using user identification information received with the notification to access historical information about prior activities of the user; and
using the historical information about prior activities of the user and current activity data received with the notification to identify the user activity.

13. The non-transitory computer-readable storage medium of claim 12, further comprising using collaborative filtering to identify the user activity based on a user activity identified for at least one other user with similar characteristics.

14. The non-transitory computer-readable storage medium of claim 11, the timing information for the data retrieval operation indicating an amount of time to wait before performing the data retrieval operation.

15. The non-transitory computer-readable storage medium of claim 11, the method further comprising making a determination that the data items are absent from the data storage local to the user computing device before performing the data retrieval operation and the causing step.

16. A computing device comprising:
a processor, configured to:
receive notification of input by a user of a user computing device;
identify a user activity corresponding to the user input;
use the identified user activity to obtain a template comprising a number of data retrieval operations for the identified activity and timing information corresponding to each data retrieval operation;
use the timing information corresponding to a data retrieval operation of the number of data retrieval operations to determine a time to perform the data retrieval operation to retrieve corresponding data items from data storage remote to the user computing device;

perform, in accordance with the determined time, the data retrieval operation to retrieve the corresponding data items from data storage remote to the user computing device; and cause the corresponding data items to be stored in data storage local to the user computing device.

17. The computing device of claim 16, identifying the user activity further comprising:

using user identification information received with the notification to access historical information about prior activities of the user; and using the historical information about prior activities of the user and current activity data received with the notification to identify the user activity.

18. The computing device of claim 17, further comprising using collaborative filtering to identify the user activity based on a user activity identified for at least one other user with similar characteristics.

19. The computing device of claim 16, the timing information for the data retrieval operation indicating an amount of time to wait before performing the data retrieval operation.

20. The computing device of claim 16, the processor further configured to make a determination that the data items are absent from the data storage local to the user computing device before performing the data retrieval operation and the causing step.

* * * * *